(12) United States Patent
Kamakau

(10) Patent No.: US 7,151,231 B2
(45) Date of Patent: Dec. 19, 2006

(54) COMBINED SUITCASE AND WEIGHING SCALE

(76) Inventor: Daniel K. Kamakau, 74-5113 Palihiolo Pl., Kailua Kona, HI (US) 96740

( * ) Notice: Subject to any disclaimer, the term of this patent is extended or adjusted under 35 U.S.C. 154(b) by 100 days.

(21) Appl. No.: 10/941,983

(22) Filed: Sep. 16, 2004

(65) Prior Publication Data

US 2006/0054364 A1 Mar. 16, 2006

(51) Int. Cl.
*G01G 19/52* (2006.01)
*G01G 19/58* (2006.01)

(52) U.S. Cl. .................. 177/126; 177/245; 206/278; 190/115

(58) Field of Classification Search ............. 190/115; 177/126, 131, 148–149, 245; 206/278
See application file for complete search history.

(56) References Cited

U.S. PATENT DOCUMENTS

| | | | | |
|---|---|---|---|---|
| 2,069,499 | A * | 2/1937 | Marin et al. | 177/238 |
| 2,518,973 | A * | 8/1950 | Atherton | 190/102 |
| 2,710,083 | A * | 6/1955 | White | 190/102 |
| 2,759,577 | A * | 8/1956 | White | 190/102 |
| 3,090,454 | A * | 5/1963 | Farrar et al. | 177/131 |
| 4,030,559 | A * | 6/1977 | Fish et al. | 177/159 |
| 4,363,368 | A | 12/1982 | Paddon et al. | |
| D274,481 | S | 7/1984 | Seynhaeve | |
| 4,800,973 | A * | 1/1989 | Angel | 177/211 |
| 4,909,340 | A | 3/1990 | Kazais et al. | |
| 4,913,248 | A * | 4/1990 | Zakai | 177/210 C |
| 5,068,944 | A | 12/1991 | Knurr | |
| 5,203,419 | A * | 4/1993 | Douglas | 177/244 |
| 5,329,069 | A | 7/1994 | Amsel et al. | |
| 5,641,947 | A * | 6/1997 | Riddle, Jr. | 177/126 |
| 5,734,128 | A | 3/1998 | Gades et al. | |
| 7,084,357 | B1 * | 8/2006 | Roberts et al. | 177/131 |
| 2005/0217903 | A1 * | 10/2005 | Roberts et al. | |
| 2005/0217904 | A1 * | 10/2005 | Hughes | |
| 2005/0224261 | A1 * | 10/2005 | Marks | |
| 2006/0086541 | A1 * | 4/2006 | Khan et al. | |

* cited by examiner

*Primary Examiner*—Randy W. Gibson

(57) ABSTRACT

A suitcase includes a housing having a plurality of sides defining a cavity therebetween wherein one side is removably disposed along a bottom surface of the housing. The suitcase includes a first elongated and flexible handle secured to select ones of the sides defining a grip portion and a second flexible handle disposed subjacent to the first handle and attached to a top of one of the sides. The suitcase further includes a mechanism for effectively determining a weight of items stored within the suitcase and a mechanism for electronically displaying the weight of the items. An internal power supply source is electrically coupled to the determining mechanism and the displaying mechanism. A plurality of casters are secured to one side and extend downwardly therefrom.

1 Claim, 4 Drawing Sheets

COMBINED SUITCASE AND WEIGHING SCALE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a suitcase and, more particularly, to a combined suitcase and weighing scale.

2. Prior Art

Luggage weight is of keen interest to travelers. Most airlines of today will impose a fee upon travelers whose luggage weight surpasses a predetermined weight, usually set at fifty pounds. Often travelers must pack their luggage only being able to guess what the actual weight of the final piece of luggage will be. This can result in an uncomfortable, embarrassing and time consuming situation when they arrive at the airport and find their luggage to be overweight. Airlines will allow travelers to redistribute their clothes etc. from suitcases that are over the predetermined weight to ones that are under that weight. This process, however, slows down the check-in procedure for all the other individuals behind the person whose luggage is too heavy.

The use of scales are well known in the prior art. It would be advantageous for a traveler to know the weight of their luggage prior to arriving at their point of departure. This can be accomplished by placing the packed suitcases on a conventional scale of the digital type with lighted digital displays showing numbers to a traveler. This procedure would be time consuming however, as the individual performing the packing would constantly have to weigh and re-weigh the suitcase until a desired weight is achieved. It would be much more advantageous, not to mention convenient, to know the weight of the suitcase as it is being filled with luggage.

Accordingly, a need remains for a combined suitcase and weighing scale in order to overcome the above-noted shortcomings. The present invention satisfies such a need by providing a combination suitcase and scale that is convenient, easy to use, and practical in design and function. Such a suitcase advantageously allows an individual to prevent the scenario of having to re-pack their belongings at the airport due to being overweight. The device allows a traveler to have ease of mind about their luggage and will lead to a more enjoyable business trip or vacation.

BRIEF SUMMARY OF THE INVENTION

In view of the foregoing background, it is therefore an object of the present invention to provide a combined suitcase and weighing scale. These and other objects, features, and advantages of the invention are provided by a suitcase including a housing having a plurality of sides sized and shaped for defining a cavity therebetween. One such side is formed from rigid material and is removably disposed along a bottom surface of the housing so that a user can conveniently access the cavity therefrom.

A first elongated and flexible handle is included having opposed end portions secured to select ones of the sides. Such a handle has a grip portion disposed medially of the end portions so that a user can readily lift and transport the suitcase between remote locations.

A second flexible handle is disposed subjacent to the first handle and attached to a top of one of the sides. Such a second handle has a length shorter than a length of the first handle.

A mechanism is included for effectively determining a weight of items stored within the suitcase. Such a weight determining mechanism is disposed within the cavity and positioned on one side for receiving the items thereon. The weight determining mechanism preferably includes a scale including a substantially planar top surface for supporting the items thereon.

The suitcase further includes a mechanism for electronically displaying the weight of the items so that a user can advantageously readily identify whether the suitcase is below a predetermined threshold weight limit. Such a displaying mechanism preferably includes an LED display panel including an electrical lead connected to the scale for effectively receiving an input signal corresponding to a cumulative load associated with the items. The display panel may be secured to the housing adjacent to the first handle so that a user can advantageously maintain a clear line of sight of the display panel during operating conditions. Of course, the display panel may be disposed on any other appropriate surface of the suitcase as is well known to persons skilled in the art. An internal power supply source is electrically coupled to the determining mechanism and the displaying mechanism. Such an internal power supply source preferably includes a 9-volt battery.

A plurality of casters are secured to the one side and extend downwardly therefrom for allowing a user to conveniently roll the suitcase along a ground surface. The suitcase may further include a plurality of tabs connected to the cavity for conveniently guiding the electrical lead along a perimeter of the housing.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
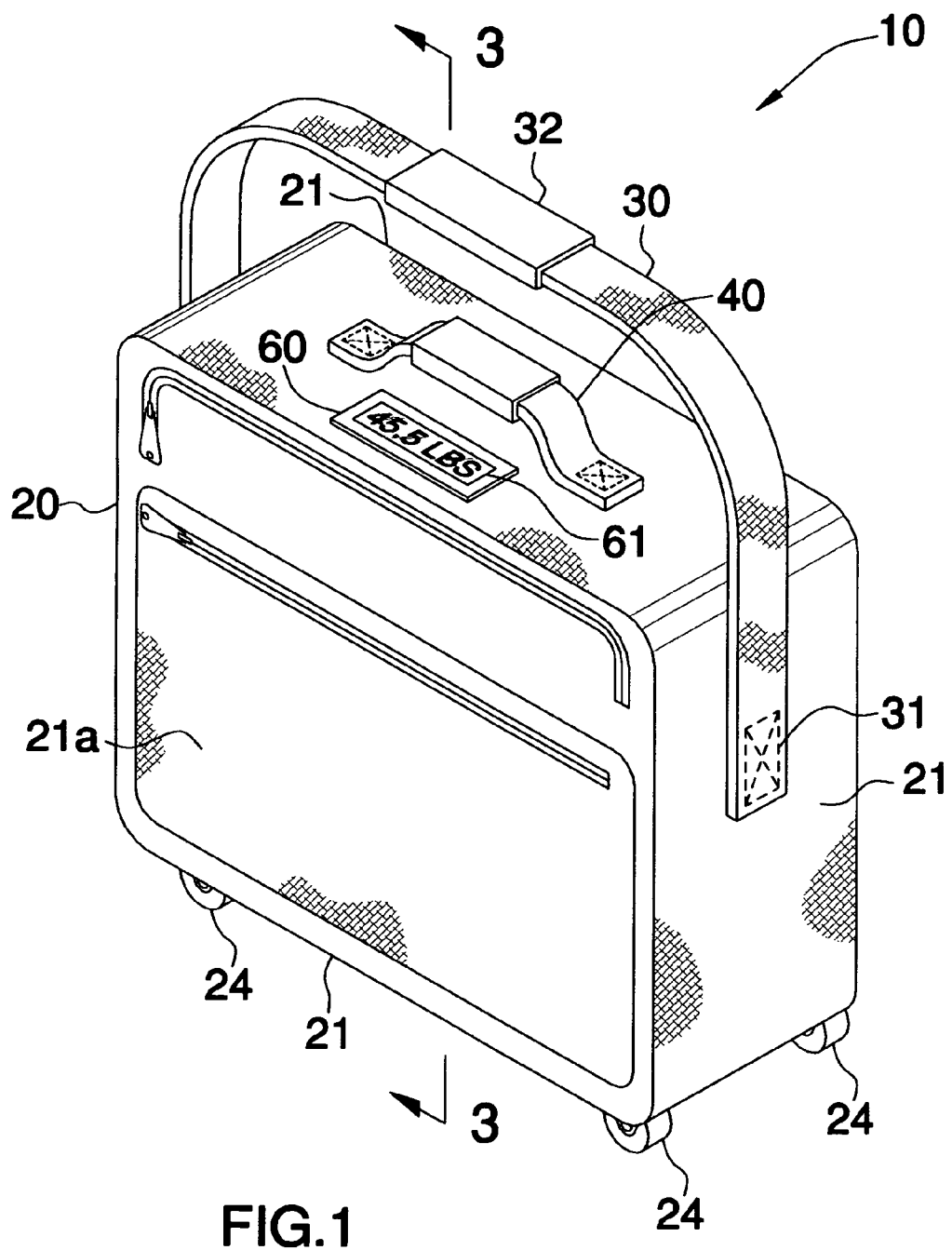
FIG. 1 is a perspective view showing a combined suitcase and weighing scale, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1–5 by the reference numeral 10 and is intended to provide a combined suitcase and weighing scale. It should be understood that the device 10 may be used to weigh the contents of many different types of containers and should not be limited to only suitcases.

Referring initially to FIG. 1, the device 10 includes a housing 20 having a plurality of sides 21 sized and shaped for defining a cavity 22 therebetween. One such side 21a is formed from rigid material and is removably disposed along a bottom surface 23 of the housing 20 so that a user can conveniently access the cavity 22 therefrom. The aforementioned suitcase may of course be provided in any number of sizes, shapes and colors, advantageously appealing to the needs of all travelers.

Figure 2:
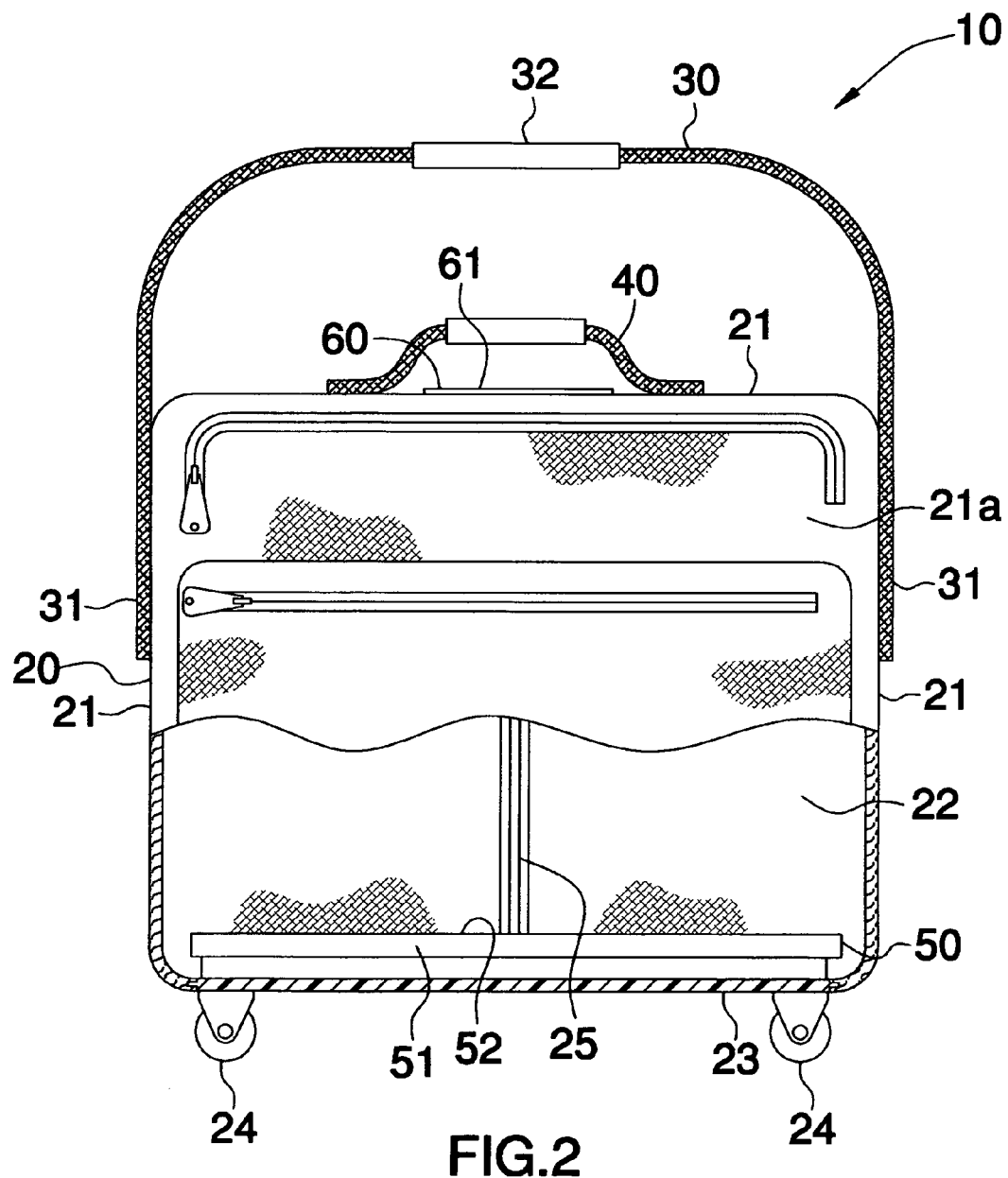
FIG. 2 is a partial cross-sectional view of the device shown in FIG. 1.

Referring to FIGS. 1 and 2, a first elongated and flexible handle 30 is included having opposed end portions 31 secured to select ones of the sides 21. Such a handle 30 has a grip portion 32 disposed medially of the end portions 31 so that a user can readily lift and transport the suitcase 10 between remote locations. The handle 30 advantageously allows an individual to carry the suitcase 10 over their shoulder, resulting in a more convenient and relaxed traveling experience.

Still referring to FIGS. 1 and 2, a second flexible handle 40 is disposed subjacent to the first handle 30 and attached to a top of one of the sides 21. Such a second handle 40 has a length shorter than a length of the first handle 30 that allows for easy vertical lifting of the suitcase 30.

Figure 3:
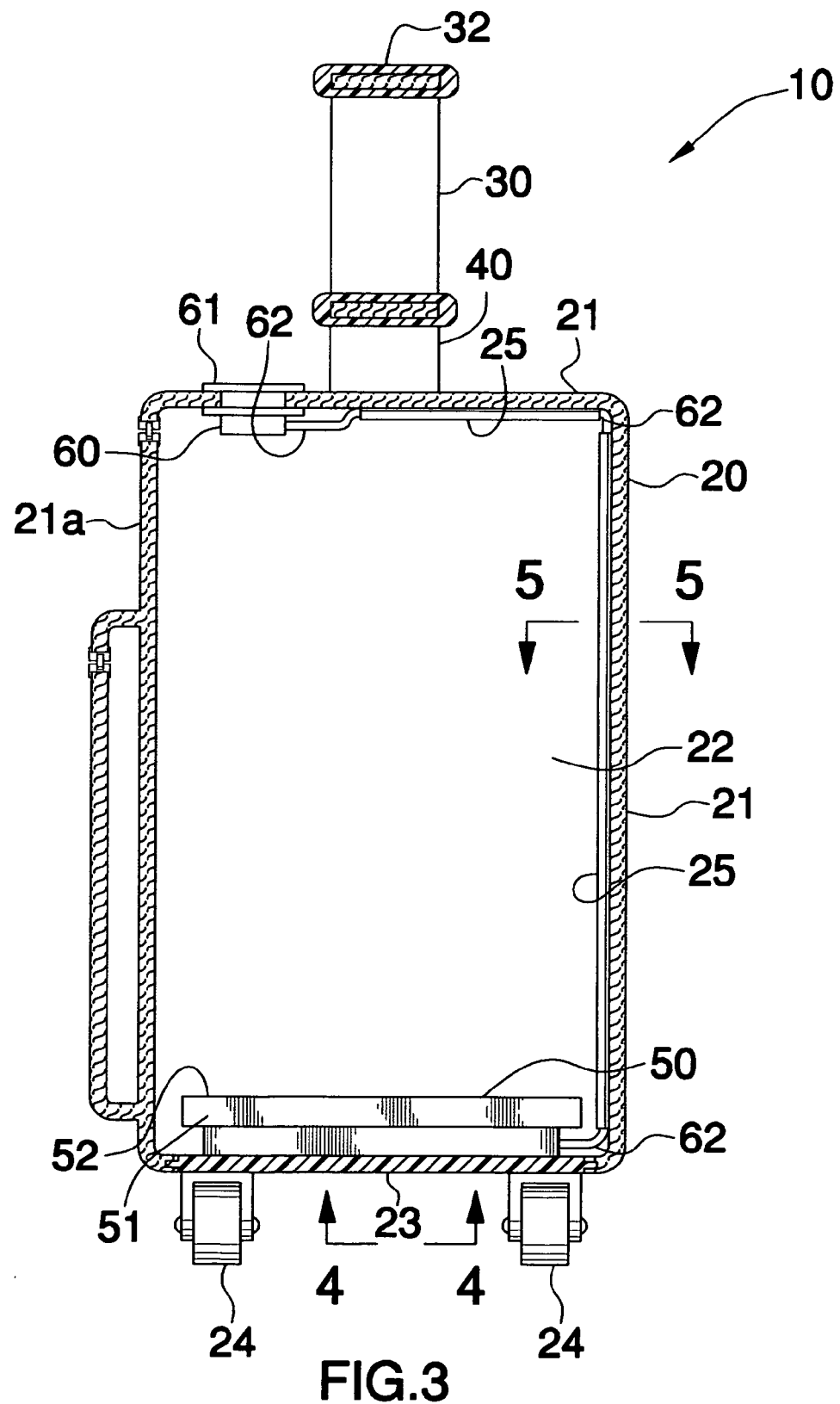
FIG. 3 is a cross-sectional view of the device shown in FIG. 1, taken along line 3—3.

Referring to FIGS. 2 and 3, a mechanism 50 is included for effectively determining a weight of items (not shown) stored within the suitcase 10. Such a weight determining mechanism 50 is disposed within the cavity 22 and positioned on one side 21 for receiving the items thereon. The weight determining mechanism 50 includes a scale 51 having a substantially planar top surface 52 for supporting the items thereon.

Figure 5:
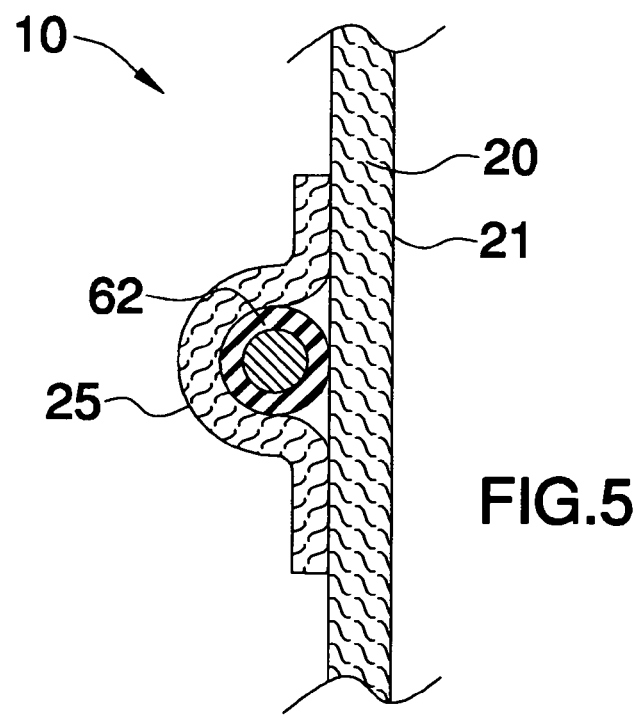
FIG. 5 is a cross-sectional view of the device shown in FIG. 1, taken along line 5—5.

Now referring to FIGS. 1, 3 and 5, the suitcase 10 further includes a mechanism 60 for electronically displaying the weight of the items so that a user can advantageously readily identify whether the suitcase 10 is below a predetermined threshold weight limit. Such a displaying mechanism 60 includes an LED display panel 61 including an electrical lead 62 connected to the scale 51 for effectively receiving an input signal corresponding to a cumulative load associated with the items.

Figure 4:
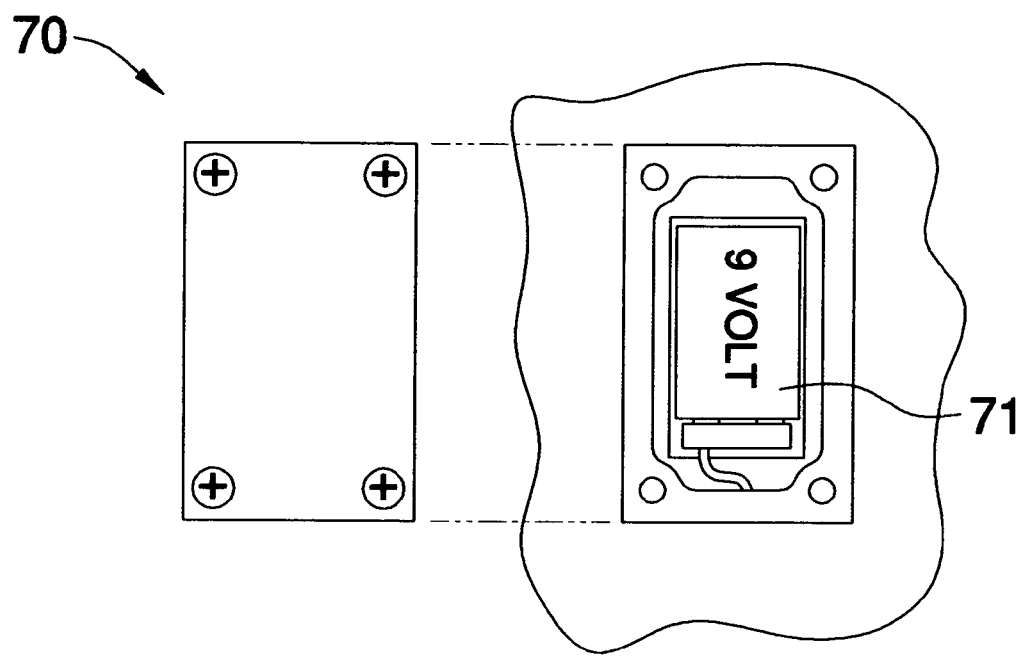
FIG. 4 is a bottom plan view of the device showing the power supply source.

The display panel 61 is secured to the housing 20 adjacent to the first handle 30 so that a user can advantageously maintain a clear line of sight of the display panel 61 during operating conditions. Of course, the display panel 61 may be disposed on any other appropriate surface of the suitcase 10 as is well known to persons skilled in the art. An internal power supply source 70 is electrically coupled to the weight determining mechanism 50 and the displaying mechanism 60 as shown in FIG. 4. Such an internal power supply source 70 includes a 9-volt battery 71.

Referring to FIGS. 1, 2 and 3, a plurality of casters 24 are secured to the one side 21 and extend downwardly therefrom for allowing a user to conveniently roll the suitcase 10 along a ground surface, advantageously allowing for increased maneuverability of the suitcase 10 while traveling. The suitcase 10 further includes a plurality of tabs 25 connected to the cavity 22 for conveniently guiding the electrical lead 62 along a perimeter of the housing, as best shown in FIGS. 3 and 5. This feature advantageously prevents the electrical lead 62 from becoming entangled with the stored items which could lead to the damage of either or both the scale 51 and the display mechanism 60.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A suitcase comprising:

a housing having a plurality of sides sized and shaped for defining a cavity therebetween, one said sides being formed from rigid material and being removably disposed along a bottom surface of said housing so that a user can access the cavity therefrom, said one side being formed from rigid material and being oriented along a horizontal plane when said housing is seated at an upright position;

a first elongate and flexible handle having opposed end portions secured to select ones of said sides, said handle having a grip portion disposed medially of said end portions so that a user can readily lift and transport said suitcase between remote locations;

a second flexible handle disposed subjacent said first handle and attached to a top one of said sides, said second handle having a length shorter than a length of said first handle;

means for determining a weight of items stored within said suitcase, said weight determining means being disposed within the cavity and positioned on said one side for receiving the items thereon, said weight determining means being directly engaged and incorporated with said one side such that said weight determining means lays along the horizontal plane for evenly receiving items thereon while said housing is oriented at the upright position, wherein a bottom opening of said housing is exposed to ambient surroundings when said one side is detached from said housing;

means for electronically displaying the weight of the items so that a user can readily identify whether the suitcase is below a predetermined threshold weight limit;

an internal power supply source electrically coupled to said determining means and said displaying means;

a plurality of casters secured to said one side and extending downwardly therefrom for allowing a user to roll said suitcase along a ground surface;

wherein said weight determining means comprises a scale including a substantially planar top surface for supporting the items thereon;

wherein said displaying means comprises an LED display panel including an electrical lead connected to said scale for receiving an input signal corresponding to a cumulative load associated with the items;

wherein said display panel is secured to said housing and adjacent to said first handle so that a user can maintain a clear line of sight of said display panel during operating conditions;

wherein said internal power supply source comprises: a 9-volt battery; and a plurality of tabs connected to the cavity for guiding said electrical lead along a perimeter of said housing, wherein one of said tabs has a longitudinal length extending orthogonally to said one side and traveling vertically upward from a bottom of said housing to a top thereof, another one of said tabs having a longitudinal length traversing beneath a top surface of said housing, said another tab extending from a rear one of said sides and terminating substantially midway between said rear side and a front one of said sides respectively;

wherein said first and second handles are vertically aligned and spaced above said top surface of said housing.

* * * * *